United States Patent [19]
Williams

[11] Patent Number: 5,974,103
[45] Date of Patent: *Oct. 26, 1999

[54] DETERMINISTIC EXCHANGE OF DATA BETWEEN SYNCHRONISED SYSTEMS SEPARATED BY A DISTANCE

[75] Inventor: Emrys John Williams, Eversholt, United Kingdom

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/675,255

[22] Filed: Jul. 1, 1996

[51] Int. Cl.⁶ .................................................. H04L 7/00

[52] U.S. Cl. ................................. 375/356; 375/354

[58] Field of Search ........................... 375/354, 362, 375/356, 364, 371, 376; 371/1; 370/516, 519; 327/152, 149, 153, 158

[56] References Cited

U.S. PATENT DOCUMENTS

| | | | |
|---|---|---|---|
| 5,249,206 | 9/1993 | Appelbaum et al. | 375/356 |
| 5,450,394 | 9/1995 | Gruber et al. | 375/356 |
| 5,450,572 | 9/1995 | Ruedinger et al. | 375/354 |

*Primary Examiner*—Chi H. Pham
*Assistant Examiner*—Emmanuel Bayard
*Attorney, Agent, or Firm*—Blakely Sokoloff Taylor & Zafman

[57] ABSTRACT

A method and apparatus provides data transmission between synchronous systems. One system has a phase locked loop to provide its local clock. The other system has a fixed clock. Fully synchronous bidirectional communication is achieved by adjusting the lengths of the delays between the systems, possibly by adjusting the cable lengths. Deterministic lock-step operation between systems separated by a significant distance is permitted where the communication delays are large compared to a single clock cycle of the systems. Practical tolerances on cable length and signal noise and jitter can be accommodated.

27 Claims, 3 Drawing Sheets

DETERMINISTIC EXCHANGE OF DATA BETWEEN SYNCHRONISED SYSTEMS SEPARATED BY A DISTANCE

BACKGROUND AND INTRODUCTION

The invention relates generally to synchronous systems and to the deterministic exchange of data between such synchronised systems separated by a distance.

Synchronous systems transfer data associated with clock events. Data cannot arrive at any time, only at times specified with respect to the nearby clocks. The advantage of this is that, with a constant frequency clock, it is possible to associate data transfer with a particular clock interval. There is no possibility of a datum arriving on a clock edge and it being uncertain in which clock interval it belongs. This arrangement allows predictable, deterministic operation of the system. Deterministic operation is critical for certain systems, for example in lockstep fault tolerant operation.

The connection between two synchronous systems, with filly synchronous input and output (I/O) at each system, implies that the frequency and phase of the clocks of the two systems have to be related. Synchronous connections are relatively straightforward when the two systems arc close together. However, when the systems are further apart, it is difficult to establish clock equivalence and to ensure data arrives at the right time because of the data transit times. The data cannot move faster than the speed of light.

An aim of the present invention is to provide a method and apparatus for establishing clock phase equivalence between two separated systems and for transferring data between the systems in a deterministic way in order that each system can conclusively allocate arriving data to a particular clock period with certainty.

SUMMARY OF THE INVENTION

In accordance with one aspect of the invention, there is provided a method for bidirectional data transmission via a link between first and second synchronous systems, wherein the first system comprises a first clock, the second system is separated by a distance from the first system and has a second clock, the method comprising: transmitting the first clock to the second system and setting the second clock to be in phase with received phase of the first clock; and setting the total transmission delay between the systems, that is the sum of the transmission delay from the first to the second system and the transmission delay from the second system to the first system, to be substantially equal to an integral number of clock periods.

In accordance with another aspect of the invention, there is provided synchronous apparatus comprising first and second synchronous systems communicating via a link, wherein: the first system comprises a first clock; the second system is separated by a distance from the first system; the second system receives the first clock via the link and generates a second clock in phase with the received phase of the first clock; and the total transmission delay between the systems, that is the sum of the transmission delay from the first to the second system and the transmission delay from the second system to the first system, is substantially equal to an integral number of clock periods.

Examples of the method and apparatus of the invention enable fully synchronous bidirectional communication between the systems. Deterministic lockstep operation between systems separated by a significant distance is possible where the communication delays are large compared to a single clock cycle of the systems. Practical tolerances on cable length and signal noise and jitter can also be accommodated.

Preferably, the second clock is provided by means of a phase locked loop in the second system, the phase locked loop being connected to receive the first clock.

A minimum total transmission delay $T_{min}$ can be defined by $$T_{min} = (T_{ab} + T_{ba})_{min} = (N * T_c) + T_{aih} - T_{boh} - T_{abc}$$

and a maximum total transmission delay $T_{max}$ can be defined by $$T_{max} = (T_{ab} + T_{ba})_{max} = (N * T_c) + T_{ais} - T_{bos} - T_{abc},$$

$T_{ab}$ is the link delay from the first to the second system, $T_{ba}$ is the link delay from the second to the first system, N is an integer, $T_c$ is the period of the first and second clocks, $T_{aih}$ is the hold time the first system requires for input data with respect to the first clock, $T_{boh}$ is a hold time the second system provides for output data with respect to the second clock, $T_{abc}$ is the delay from the first clock to the second clock as observed at the second system, $T_{ais}$ is the setup time the first system requires for input data with respect to first clock and $T_{bos}$ is the setup time the second system provides for output data with respect to the second clock.

By adjusting the link lengths, the total transmission delay can be arranged to be substantially an integral number N of clock periods.

Where the first and second links comprise first and second cables, the combined cable length for the first and second links can be set such that the total transmission delay is substantially an integral number of clock periods. The cables can have, but need not have, substantially the same length.

Where the first and second links comprise a common cable, the cable length can be set for the first and second links such that the total transmission delay is substantially an integral number of clock periods.

The first and second links can comprise co-axial cable links, or optical cable links, or the links can be electromagnetic radiation (e.g. radio or infrared) links.

A delay unit can be provided in the link having a delay such that the total transmission delay between the systems, that is the sum of the transmission delay from the first to the second system and the transmission delay from the second system to the first system, is substantially an integral number of clock periods. The delay unit can have a variable delay. It can, for example, be a semiconductor delay circuit having a series of buffer amplifiers, wherein a buffer output is selected to provide a delay such that the total transmission delay between the systems, that is the sum of the transmission delay from the first to the second system and the transmission delay from the second system to the first system, is substantially an integral number of clock periods.

The first and second systems can form subsystems of a lockstep fault tolerant computer system.

DESCRIPTION OF THE DRAWINGS

Embodiment to the invention will be described hereinafter with reference to the accompanying drawings in which like reference signs relate to like features and in which.

DETAILED DESCRIPTION OF PREFERRED EMBODIMENTS

Figure 1:
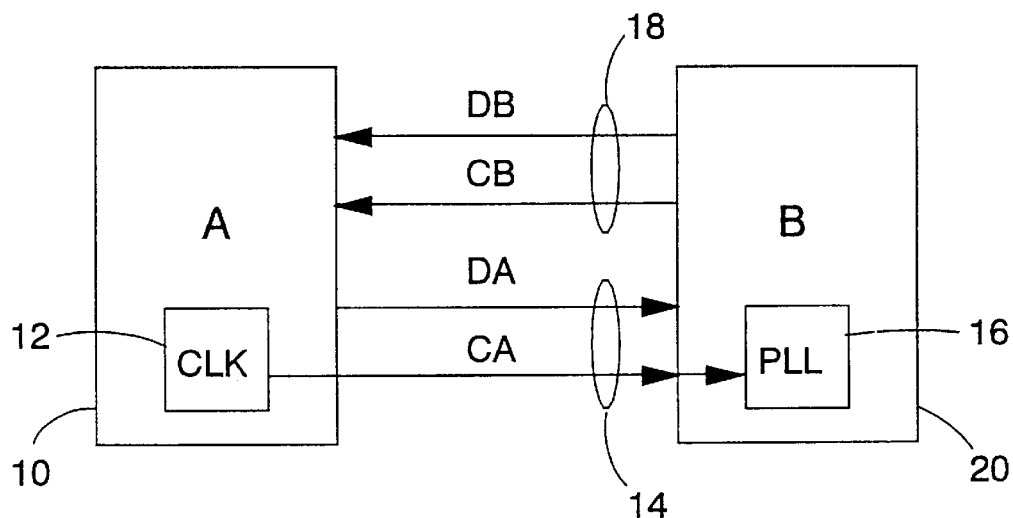
FIG. 1 is a schematic overview of synchronous apparatus comprising two systems separated by a distance.

FIG. 1 is a schematic representation of apparatus in which two systems A 10 and B 20 separated by a distance. System A includes a clock generator (CLK) 12 for generating a clock CA for that system. System A transmits clock CA and data DA to system B via link 14. System B includes a phase locked loop (PLL) 16 which receives clock CA for generating a local clock CB in phase with the received clock CA. Optionally system B transmits the clock CB with the data DB to system A via a link 18.

Figure 2:
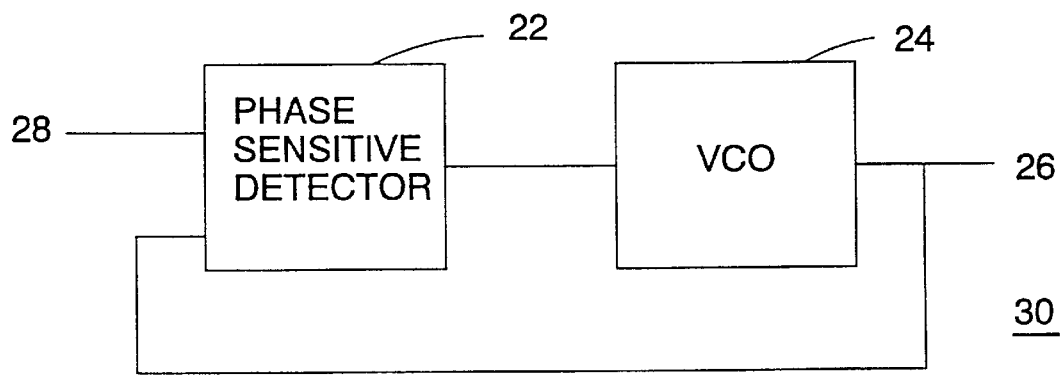
FIG. 2 is a schematic block diagram of a phase locked loop.

A conventional technique for synchronising a local clock to a reference clock is to use a phase locked loop (PLL) 30 as represented in FIG. 2. FIG. 2 illustrates a conventional phase locked loop comprising a phase sensitive detector 22 and a voltage controlled oscillator (VCO) 24. The output of the VCO 24, which forms the local clock 26, is fed back to one input of the phase sensitive detector 22. The other input of the phase sensitive detector is connected to the reference clock 28. The phase sensitive detector compares the phase of the reference clock 28 and the signal 26 fed back from the VCO 24 and generates a control voltage in dependence upon the comparison to control the VCO 24, and hence the local clock 26, to be in phase with the reference clock 28.

Accordingly, the phase locked loop acts to align the local clock with the reference clock, so that the local clock has identical phase and frequency to the reference. This has the advantage that the local clock spectrum can be controlled, rejecting noise and jitter on the reference clock and possibly even coping with a missing reference clock.

A phase locked loop is sufficient in a master-slave type arrangement where it is merely necessary for the slave clock to be kept in phase with the master clock and to provide for the transfer of data from the master to the slave. However, the use of a phase locked loop is not sufficient to ensure full deterministic operation for two directional data transfer between synchronised systems at a distance as will now be explained.

Figure 3:
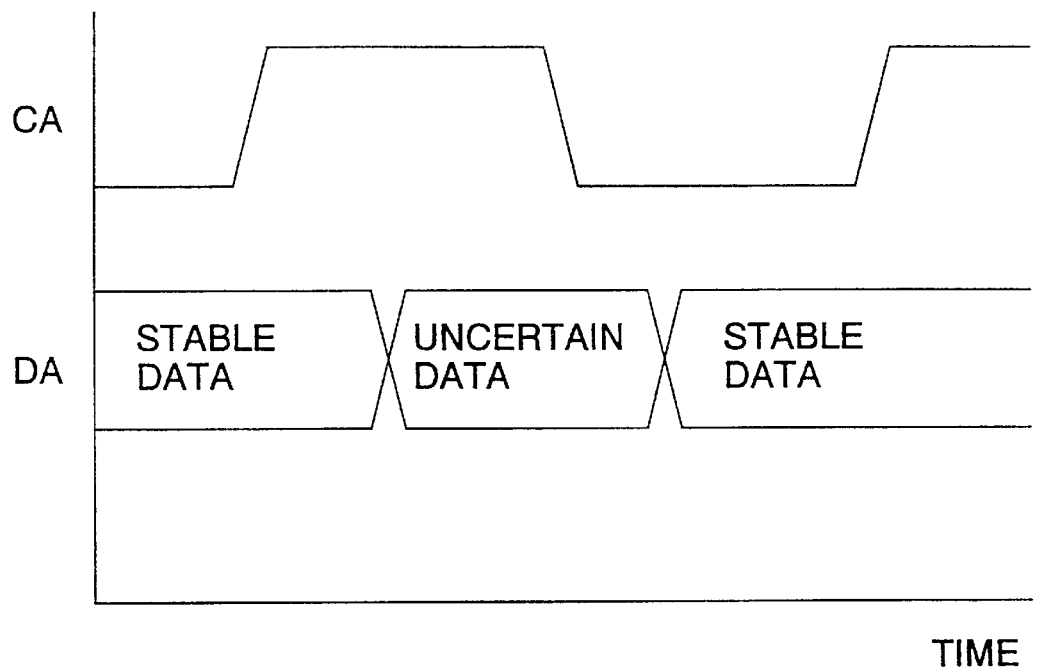
FIG. 3 is a timing diagram.
Figure 4:
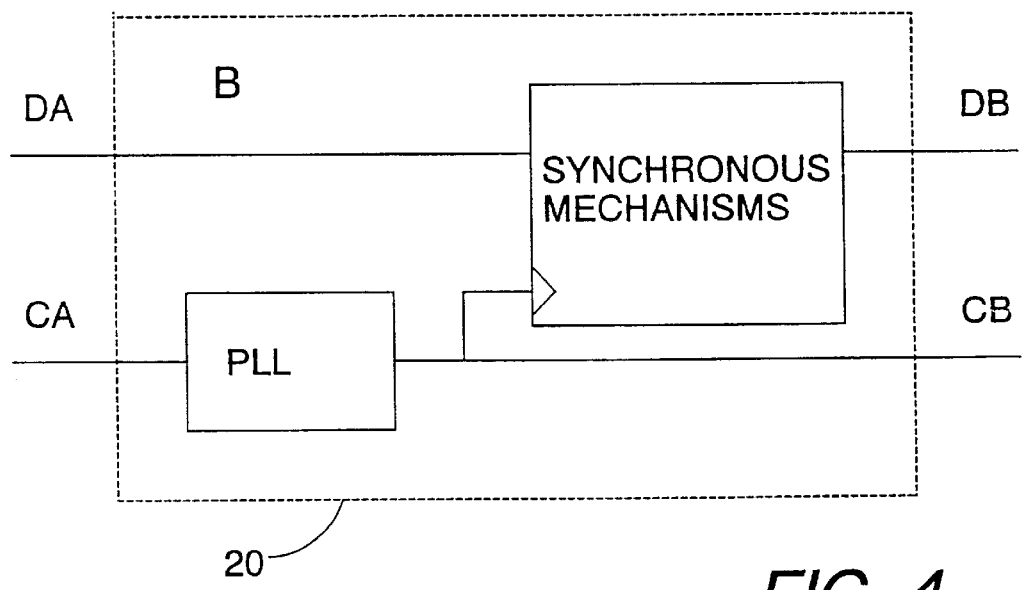
FIG. 4 is a schematic block diagram illustrating one of the systems of FIG. 1.

Consider two communicating synchronous systems in an arrangement as illustrated in FIG. 1. System A sends data to system B. System A provides one data word associated with each period of its internal clock, and sends a copy of its clock along with the data to system B. Systems A and B are some distance apart, but the clock and the data from system A are delayed by the same amount. Accordingly, the timing relationship of clock and data at arrival at B are the same as at transmission from A, setting aside noise and jitter acquired in transmission. FIG. 3 shows the relationship between the data DA and clock CA transmitted by system A, whether observed directly at system A's output or after the data and clock have travelled some distance. System A transmits data that is stable for a time before and after the rising edge of the clock, but is unstable when the data word is changing in the middle of the clock. As shown in FIG. 4, system B contains synchronous mechanisms 32 clocked by the system B local clock CB. The operation of these mechanisms will depend on the data value supplied each clock from system A. As long as the received data is stable for enough time before and after the clock CB, the circuit operation will be deterministic. There will be no confusion about what data is associated with what clock edge.

As mentioned above, system B has its own internal clock CB. For simple operation with deterministic signalling, system B uses system A's clock signal as a reference to a PLL to generate its internal clock CB. System B may then sample the data words arriving from system A using system B's own internal clock CB for the receiver logic. The timing is the same as using the received version of system A's clock but the local clock is stable and consistent, unaffected by transient disturbance of the received signal.

The PLL and the data timing provide some margin for error in the arrival of signals from system A. Should a datum be slightly delayed or advanced, it will still be correctly acted upon at B provided that it has not moved too far. It will still be associated with the same clock edge at B.

However, a problem arises when system B has to send data back to system A. System B generates data outputs synchronous to its own internal clock CB. This clock is maintained phase locked to the received version of system A's clock CA. Therefore, data sent by system B to system A will be observed to arrive at system A at the same frequency as system A's internal clock. However, the phase will depend on the trip delays between systems A and B.

Figure 5:
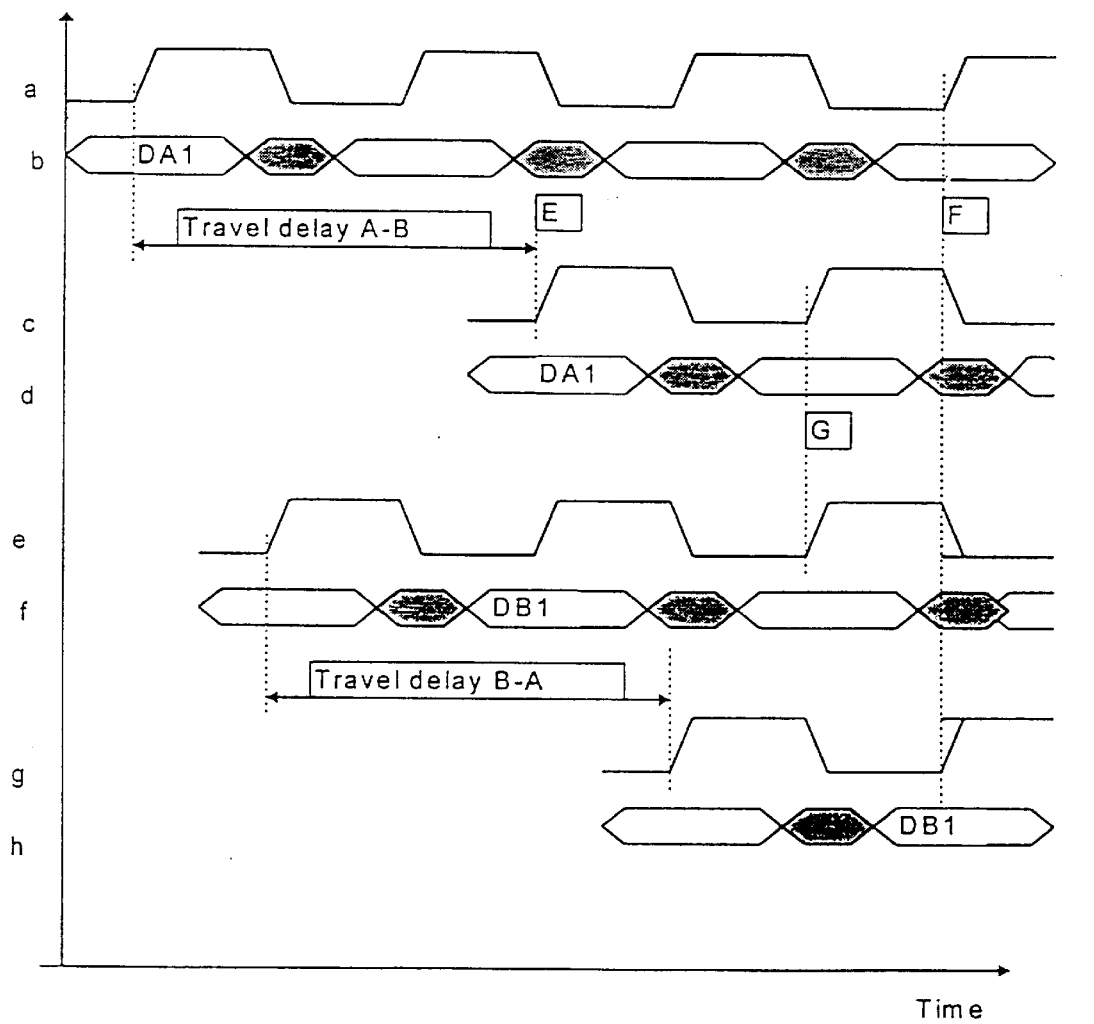
FIG. 5 is a timing diagram.

FIG. 5 illustrates the overall clock and data relationships. In FIG. 5, signal a represents the system A clock as observed at the system A output. Signal b represents the system A Tx data as observed at the system A output. Signal c represents the system A clock as observed at the system B input. Signal d represents the system A Tx data as observed at the system B input. Signal e represents the system B clock as observed at the system B output. Signal f represents the system B Tx data as observed at the system B output. Signal g represents the system B clock as observed at the system A input. Signal h represents the system B Tx data as observed at the system A input. The horizontal axis represents time. As shown, data DA1 is transmitted on a clock edge at system A. After the clock and data signals are delayed by the same amount on the trip to system B, DA1 still has the same relationship to the clock. System B's clock is phase-locked by the receiver PLL and aligned with the received version of system A's clock which is just right for sampling the data received from system A. This relationship is independent of the delay from system A to system B, provided that the clock and data delays are the same.

For wholly determined operation of the combined system A and B, data from system B has to be associated with a particular clock edge at system A. System A will contain synchronous mechanisms, clocked by system A's local clock, with operation depending on the value of data observed from system B. Again, this data has to be stable around system A's clock edge for predictable operation. System A's clock is fixed frequency, unlike system B's which is locked to the received clock by a PLL.

In an embodiment of the invention, therefore, in order to obtain the correct setup and hold time for the data arriving at system A, the propagation delay in the links from system A to system B and from system B to system A is controlled.

The data arriving from system B at system A is timed for system A's clock to sample it without ambiguity. System B transmits data with the same relationship to its local clock as system A does. FIG. 5 shows at point E that system A's data is correctly sampled by system B. Point G shows how system B's clock phase is locked to the received version of system A's clock. Point F shows system B's data being correctly sampled by system A.

In an embodiment of the invention, therefore, the link delay from system A to system B plus the link delay from system B to system A is a multiple of the clock period, thus ensuring successful bidirectional deterministic communications. Correct operation can be secured by correct selection of the cable lengths and/or the accurate setting of internal delays.

In the following, it is explained how to calculate the link delays in order that two systems can communicate synchronously, that is in order that they generate and accept data which has a specified setup time and hold time with respect to the clock.

The following symbols are used to represent the parameters involved.

$T_{abc}$ The delay from the A clock, as observed at system B, to the regenerated system B local clock.

$T_{ab}$ The link delay from system A to system B. This includes both delays due to any clock buffering and communications chips and also the travel-time delay in the cable, fibre or wireless transmission medium.

$T_{ba}$ The link delay from system B to system A. This includes both delays due to any clock buffering and communications chips and also the travel-time delay in the cable, fibre or wireless transmission medium.

$T_{bos}$ The setup time that system B provides for output data with respect to B's local clock.

$T_{boh}$ The hold time that system B provides for output data with respect to B's local clock.

$T_{ais}$ The setup time that system A requires for input data with respect to A's local clock.

$T_{aih}$ The hold time that system A requires for input data with respect to A's local clock.

$T_c$ The period of the local clock in either system A or B.
N A non-zero integer.

System B's phase lock loop acts to ensure that system A's data is correctly received at system B. If there is any problem with the setup and hold time of A's output data at system B, system B's PLL is easily adjusted by the insertion of a local delay in the PLL to move system B's phase with respect to the incoming system A signal. This leads to the $T_{abc}$ parameter.

If system A's clock transitions at time T, this transition will be observed at system B at time $$T+T_{ab}.$$

System B's phase lock loop acts so that B's local clock transits at time $$T+T_{ab}+T_{abc}.$$

System B provides data which has a setup time and hold time with respect to B's local clock. The data will be valid at $$T+T_{ab}+T_{abc}+T_{bos} \text{ ($T_{bos}$ is usually negative)},$$

and will remain valid until the hold time after the clock at $$T+T_{ab}+T_{abc}+T_{boh}.$$

After the time-of-flight delay from system B to system A, the data will be valid at $$T+T_{ab}+T_{abc}+T_{bos}+T_{ba}$$

and will remain valid until $$T+T_{ab}+T_{abc}+T_{boh}+T_{ba}.$$

The data arriving at system A is required to obey system A's input setup and hold time requirements for it to be observed correctly. Because of the transit times, some clock cycles will have passed by the time the data arrives at system A. However, the data will be received correctly if it is aligned to any transition in A's local clock. The local clock edge in use will occur in system A at time $$T+(N^*T_c).$$

System A will thus require input data to be set up before $$T+(N^*T_c)+T_{ais}$$

and to be held later than $$T+(N^*T_c)+T_{aih}.$$

So, for successful synchronous communications from system B to system A, the setup time demands that $$T+T_{ab}+T_{abc}+T_{bos}+T_{ba}<T+(N^*T_c)+T_{ais}$$

and the hold time demands that $$T+T_{ab}+T_{abc}+T_{boh}+T_{ba}>T+(N^*T_c)+T_{aih}.$$

These equations condense to $$T_{ab}+T_{ba}>(N^*T_c)+T_{aih}-T_{boh}-T_{abc}$$

and $$T_{ab}+T_{ba}<(N^*T_c)+T_{ais}-T_{bos}-T_{abc}$$

which govern maximum and minimum values for the link delays. It is noted that the sum of the delays $T_{ab}+T_{ba}$ is constrained, and not the value of either of the delays. This occurs because of the action of system B's PLL. However, for simplicity of construction, it may be convenient to make the cable lengths identical.

As an example, consider a system where $T_{abc}$ is 0, $T_c$ is 10 ns, $T_{boh}$ is 2 ns, $T_{bos}$ is −6 ns, $T_{ais}$ is −2 ns and $T_{aih}$ is 0 ns. Written wholly in nanoseconds, the equations provide $$T_{ab}+T_{ba}>(N^*10)+0-2-0$$

$$T_{ab}+T_{ba}<(N^*10)-2+6-0$$

or $$T_{ab}+T_{ba}>(N^*10)-2$$

$$T_{ab}+T_{ba}<(N^*10)+4.$$

So, using identical cable lengths $$T_{ab}=T_{ba}=T_{flight}$$

$$T_{flight}>(N^*5)-1$$

$$T_{flight}<(N^*5)+2$$

and the designer is free to choose any value of N which is convenient, given the distance between the systems.

If N=6, $$T_{flight}>29 \text{ ns}$$

$$T_{flight}<32 \text{ ns}$$

This immediately gives upper and lower bounds for the acceptable cable lengths for fully synchronous operation. The tolerance is 3 ns or about 10 per cent of the cable delay, clearly an attainable value. For a typical coaxial cable with a signal velocity 80% that of light in free space, this would allow a separation of the systems by up to 7 meters.

The tolerance on the cable length can also be interpreted as a tolerance on the arrival time of the signals. The tolerance represents a total budget for errors from all causes. If the cable length tolerance is kept smaller than this, some tolerance is then available for clock jitter and noise.

The foregoing description has been described in terms of data between the systems consisting of a data word associated with a separate clock trace. This is just one possibility. Semiconductor devices exist for the transmission of parallel words in a synchronous fashion down single cables or fibres, with the data rate on the cable higher than the word rate, and the clock phase information encoded onto the single cable as well. Such a device can emulate the conventional parallel link with a separate clock. Any scheme which provides unidirectional communication of data associated with a clock can be used in either the system A to system B link or the system B to system A link, provided that the output clock frequency is the same as the input frequency and that the effective delay through the link is more or less constant. A synchronous serial transmission system in the gigabit-per-second region is very suitable.

The delay variation here has been assumed to be controlled by varying the cable length. Other delay variation mechanisms are also usable. These include the use of semiconductor delay chips where the signal is passed through a chain of buffer amplifiers and the delay is varied by selecting which buffer provides the output signal.

There has been described a method and apparatus for data transmission between synchronous systems. One system has a phase locked loop to provide its local clock. The other system has a fixed clock. Fully synchronous bidirectional communication is achieved by adjusting the lengths of the delays between the systems, possibly by adjusting the cable lengths.

An embodiment of the invention enables deterministic lockstep operation between systems separated by a significant distance, so that the communication delays are large compared to a single clock cycle of the systems. An embodiment of the invention can accommodate practical tolerances on cable length and signal noise and jitter.

Although particular embodiments of the inventions have been described, it will be appreciated that the invention is not limited thereto, and many modifications and/or additions may be made within the spirit and scope of the invention as defined in the appended claims. For example, different combinations of the features of the dependent claims may be combined with the features of the independent claims.

What I claim is:

1. A method for bi-directional data transmission via a bi-directional link between first and second synchronous systems, wherein said first system comprises a first clock, and said second system is separated by a distance from said first system and has a second clock, said method comprising:

transmitting said first clock to said second system and setting said second clock to be in phase with a received phase of said first clock; and providing a delay unit on a link to adjust a total transmission delay between said systems to be substantially equal to an integral number of periods wherein said total transmission delay includes a signal transmit time via the link from said first to said second system and a signal transit time via the link from said second to said first system.

2. A method according to claim 1, comprises generating said second clock by means of a phase locked loop in said second system, said phase locked loop being connected to receive said first clock.

3. A method according to claim 1, wherein a minimum total transmission delay $T_{min}$ is defined by $$T_{min}=(T_{ab}+T_{ba})_{min}=(N*T_c)+T_{aih}-T_{boh}-T_{abc}$$

and a maximum total transmission delay $T_{max}$ is defined by $$T_{max}=(T_{ab}+T_{ba})_{max}=(N*T_c)+T_{ais}-T_{bos}-T_{abc},$$

$T_{ab}$ is a link delay from the first to the second system, $T_{ba}$ is a link delay from the second to the first system, N is a non-zero integer, $T_c$ is a period of the first and second clocks, $T_{aih}$ is a hold time the first system requires for input data with respect to the first clock, $T_{boh}$ is a hold time the second system provides for output data with respect to the second clock, $T_{abc}$ is a delay from the first clock to the second clock as observed at the second system, $T_{ais}$ is a setup time the first system requires for input data with respect to first clock and $T_{bos}$ is a setup time the second system provides for output data with respect to the second clock.

4. A method according to claim 3, wherein said transmission delays include a signal transit time via a first link from said first to said second systems and a signal transit time via a second link from said second to said first systems, wherein said delay unit is provided by adjusting said first and/or second link lengths such that said total transmission delay is substantially equal to an integral number N of clock periods.

5. A method according to claim 4, wherein said first and second links comprise first and second cables, said method comprising setting a combined length for said first and second links such that said total transmission delay is substantially an integral number of clock periods.

6. A method according to claim 5, wherein said first and second cables have substantially the same length.

7. A method according to claim 4, wherein said first and second links comprise a common cable, said method comprising setting the cable length for said first and second links such that said total transmission delay is substantially an integral number of clock periods.

8. A method according to claim 4, wherein said first and second links comprise co-axial cable links.

9. A method according to claim 4, wherein said first and second links comprise optical cable links.

10. A method according to claim 4, wherein said first and second links comprise electromagnetic radiation links.

11. A method according to claim 1 wherein said delay unit has a variable delay.

12. A method according to claim 11, wherein said delay unit is a semiconductor delay circuit having a series of buffer amplifiers, said method comprising selecting a buffer output to provide a delay such that the total transmission delay between said systems, that is the sum of the transmission delay from said first to said second system and the transmission delay from said second system to said first system, is substantially equal to an integral number of clock periods.

13. A method according to claim 1, wherein said first and second systems form subsystems of a lockstep fault tolerant computer system.

14. Synchronous apparatus comprising first and second synchronous systems communicating via a link, wherein:

said first system comprises a first clock;

said second system is separated by a distance from said first system;

said second system receives said first clock via said link and generates a second clock in phase with a received phase of said first clock; and a delay unit provided on the link to adjust a total transmission delay between said systems, that is a sum of a transmission delay from said first to said second system and a transmission delay from said second system to said first system, is substantially equal to an integral number of clock parts wherein said total transmission delay includes a signal transmit time via the link from said first to said second system and a signal transit time via the link from said second to said first system.

15. Synchronous apparatus according to claim 14, wherein said second system comprises a phase locked loop, connected to receive said first clock, for generating said second clock in phase with said first clock.

16. Apparatus according to claim 14, wherein a minimum total transmission delay $T_{min}$ is defined by $$T_{min}=(T_{ab}+T_{ba})_{min}=(N*T_c)+T_{aih}-T_{boh}-T_{abc}$$

and a maximum total transmission delay is defined by $$T_{max}=(T_{ab}+T_{ba})_{max}=(N*T_c)+T_{ais}-T_{bos}-T_{abc},$$

$T_{ab}$ is a link delay from the first to the second system, $T_{ba}$ is a link delay from the second to the first system, N is an integer, $T_c$ is a period of the first and second clocks, $T_{aih}$ is a hold time the first system requires for input data with respect to the first clock, $T_{boh}$ is a hold time the second system provides for output data with respect to the second clock, $T_{abc}$ is a delay from the first clock to the second clock as observed at the second system, $T_{ais}$ is a setup time the first system requires for input data with respect to first clock and $T_{bos}$ is a setup time the second system provides for output data with respect to the second clock.

17. Apparatus according to claim 14, wherein said transmission delays include a signal transit time via a first link from said first to second systems and a signal transit time via a second link from said second to first systems, said first and second link lengths being set such that said total transmission delay is substantially equal to an integral number of clock periods.

18. Apparatus according to claim 14, wherein said first and second links comprise first and second cables, a combined cable length for said first and second links being set such that said total transmission delay is substantially an integral number of clock periods.

19. Apparatus according to claim 18, wherein said first and second cables have substantially the same length.

20. Apparatus according to claim 18, wherein said first and second links comprise a common cable, said cable length being set for said first and second links such that said total transmission delay is substantially equal to an integral number of clock periods.

21. Apparatus according to claim 17, wherein said first and second links comprise co-axial cable links.

22. Apparatus according to claim 17, wherein said first and second links comprise optical cable links.

23. Apparatus according to claim 17, wherein said first and second links comprise electromagnetic radiation links.

24. Apparatus according to claim 14 wherein said delay unit has a variable delay.

25. Apparatus according to claim 14, wherein said delay unit is a semiconductor delay circuit having a series of buffer amplifiers, wherein an output from a selected buffer output provides a delay such that the total transmission delay between said systems, that is the sum of the transmission delay from said first to said second system and the transmission delay from said second system to said first system, is substantially equal to an integral number of clock periods.

26. A lockstep fault tolerant computer system comprising apparatus according to claim 14, wherein said first and second systems are subsystems of said lockstep fault tolerant computer system.

27. Synchronous apparatus comprising first and second synchronous systems communicating via a link, wherein:
said first system comprises a first clock that is constant;
said second system is separated by a distance from said first system;
said second system receives said first clock via said link and generates a second clock in phase with a received phase of said first clock; and
a delay unit provided on the link to adjust a total transmission delay between said systems, that is a sum of a transmission delay from said first to said second system and a transmission delay from said second system to said first system, is substantially equal to an integral number of clock periods wherein said total transmission delay includes a signal transmit time via the link from said first to said second system and a signal transit time via the link from said second to said first system.

* * * * *